United States Patent
Park et al.

(10) Patent No.: US 7,933,524 B2
(45) Date of Patent: Apr. 26, 2011

(54) APPARATUS FOR AND METHOD OF GENERATING MILLIMETER WAVES

(75) Inventors: Kyung Hyun Park, Daejeon (KR); Young Ahn Leem, Daejeon (KR); Kwang Hyun Lee, Seoul (KR); Woo Young Choi, Seoul (KR)

(73) Assignees: Electronics and Telecommunications Research Institute, Daejeon (KR); Industry-Academic Cooperation Foundation, Yonsei-University, Seoul (KR)

( * ) Notice: Subject to any disclaimer, the term of this patent is extended or adjusted under 35 U.S.C. 154(b) by 1275 days.

(21) Appl. No.: 11/500,646

(22) Filed: Aug. 8, 2006

(65) Prior Publication Data

US 2007/0212074 A1    Sep. 13, 2007

(30) Foreign Application Priority Data

Mar. 10, 2006    (KR) .................. 10-2006-0022706

(51) Int. Cl.
*H04B 10/04* (2006.01)
(52) U.S. Cl. ......... 398/183; 398/182; 398/192; 398/201
(58) Field of Classification Search .......... 398/182–198; 372/18–20
See application file for complete search history.

(56) References Cited

U.S. PATENT DOCUMENTS

| 5,450,428 | A | * | 9/1995 | Maeda ........................... 372/20 |
| 5,604,827 | A |   | 2/1997 | Yamaguchi |
| 5,631,916 | A |   | 5/1997 | Georges et al. |
| 5,710,651 | A |   | 1/1998 | Logan, Jr. |
| 6,043,104 | A | * | 3/2000 | Uchida et al. ................... 438/32 |
| 6,111,678 | A |   | 8/2000 | Mathoorasing et al. |
| 6,525,857 | B1 | * | 2/2003 | Way et al. ..................... 398/192 |
| 6,928,098 | B2 |   | 8/2005 | Kim et al. |
| 2002/0146046 | A1 | * | 10/2002 | Kim et al. ...................... 372/20 |
| 2004/0179569 | A1 | * | 9/2004 | Sato et al. ...................... 372/50 |
| 2005/0169641 | A1 | * | 8/2005 | Ogusu .......................... 398/183 |
| 2006/0227825 | A1 |   | 10/2006 | Kovsh et al. |
| 2007/0091941 | A1 | * | 4/2007 | Mori et al. ..................... 372/18 |

FOREIGN PATENT DOCUMENTS

| JP | 8321652 | 12/1996 |
| JP | 2000-082993 | 3/2000 |
| JP | 2000-196187 | 7/2000 |
| JP | 2002-335055 | 11/2002 |

(Continued)

OTHER PUBLICATIONS

Grosskopf et al: "Optical Millimeter-Wave Generation and Wireless Data Transmission Using a Dual-Mode Laser", IEEE Photonics Technology Letters, vol. 12, No. 12, Dec. 2000, p. 1692-1694.*

(Continued)

*Primary Examiner* — Li Liu
(74) *Attorney, Agent, or Firm* — Ladas & Parry LLP

(57) ABSTRACT

Provided are an apparatus for and a method of generating millimeter waves, in which millimeter-wave generation and frequency up-conversion can be achieved at the same time using a single device. The apparatus includes a mode-locking laser diode (LD) which has a distributed feedback (DFB) sector and a gain sector and generates high-frequency optical pulses through a passive mode locking process, a modulator which modulates an external optical signal using an electric signal and injects the modulated optical signal to the mode-locking LD to lock the optical pulses, and a radio frequency (RF) locking signaling unit which injects the electric signal to the modulator.

23 Claims, 4 Drawing Sheets

FOREIGN PATENT DOCUMENTS

| JP | 2005-159118 | 6/2005 |
|---|---|---|
| JP | 2005-323145 | 11/2005 |
| JP | 2005-328327 | 11/2005 |
| JP | 2007-173958 | 7/2007 |
| WO | 2005/076422 | 8/2005 |

OTHER PUBLICATIONS

Leem et al: "Self-Pulsation in Multisection Laser Diodes With a DFB Reflector", IEEE Photonics Technology Letters, vol. 18, No. 4, Feb. 2006, p. 622-624.*

Yee et al: "Widely Frequency-Tunable Amplified Feedback Laers for 10-GHz Optical Pulsation", IEEE Photonics Technology Letters, vol. 17, No. 6, Jun. 2005, pp. 1151-1153.*

Kuri et al: "Long-Term Stabilized Millimeter-Wave Gneration Using a High-Power Mode-Locked Laser Diode Module", IEEE Transactions on Microwave Theory and Techniques, vol. 47, No. 5, May 1999, pp. 570-574.*

Seo et al: "SOA-EAM Frequency Up/Down-Converters for 60-GHz Bi-Directional Radio-on-Fiber Systems", IEEE Transactions on Microwave Theory and Techniques, vol. 54, No. 2, Feb. 2006, pp. 959-966.*

Leem et al: "A Novel Self-Pulsation in Laser Diodes with a DFB Reflector", LEOS 2005, Sydney, Australia, Oct. 22, 2005, paper ThS6, pp. 878-879.*

Lee et al: "All-optical harmonic frequency upconversion of radio over fiber signal using cross-phase modulation in semiconductor optical amplifier", Electronics Letters, vol. 40, No. 19, Sep. 16, 2004, pp. 1211-1212.*

Ohno et al: "Application of DBR Mode-Locked Lasers in Millimeter-Wave Fiber-Radio System", J. Lightwave technology, vol. 18, No. 1, Jan. 2000, pp. 44-49.*

Grosskopf, G. et al. "Optical Millimeter-Wave Generation and Wireless Data Transmission Using a Dual-Mode Laser," IEEE Photonics Technology Letters, vol. 12, No. 12, Dec. 2000.

Lee, Kwanghyun et al. "All-optical harmonic up-converters using Amplified Feedback Lasers for RoF Systems," *presented at* Photonics Conference 2005, Korea, Nov. 2005.

Bornholdt, C., et al. '60 GHz Millimeter-Wave Broadband Wireless Access Demonstrator for the Next-Generation Mobile Internet', OFC 2002, Tuesday Afternoon, pp. 148-149.

* cited by examiner

APPARATUS FOR AND METHOD OF GENERATING MILLIMETER WAVES

CROSS-REFERENCE TO RELATED PATENT APPLICATION

This application claims the benefit of Korean Patent Application No. 10-2006-0022706, filed on Mar. 10, 2006, in the Korean Intellectual Property Office, the disclosure of which is incorporated herein in its entirety by reference.

BACKGROUND OF THE INVENTION

1. Field of the Invention

The present invention relates to a wired/wireless integrated network operating at several tens of GHz, i.e., a radio-over-fiber (RoF) system, and more particularly, to an apparatus for and a method of generating millimeter waves required for the RoF system.

2. Description of the Related Art

Next-generation wireless communication networks required to satisfy both an increase in the number of communication service types and an improvement in the quality of service should use high carrier frequencies, e.g., millimeter waves, instead of conventionally used frequencies. This means that the establishment of a network having a small cell size is required. In this case, linkage with an optical communication network is essential for the efficient establishment and management of a system. Such a system in which an optical communication network and a wireless communication network are linked is called a radio-over-fiber (RoF) system.

The core portions of a RoF system are a portion for generating millimeter waves and a frequency up-converting portion for up-converting a digital data signal in a low-frequency band to a millimeter-wave band. Recently, extensive research has been conducted into the implementation a millimeter-wave generator and a frequency up-converter using an optical method in order to establish a low-cost system. Millimeter-waves may be generated by locking several light diodes (LDs) or by using a high-speed external modulator.

However, when several LDs are locked, stringent operating conditions between the different LDs, e.g., temperature, injected currents, and polarization states, should be met. In addition, when an external modulator is used, an expensive device is required for generating millimeter waves.

Frequency up-converters have also been extensively researched. As part of this research, frequency up-converting methods which use the non-linearity of a mach-zehnder optical modulator (MZM), a photo diode (PD), and a semiconductor optical amplifier (SOA) have been suggested. In particular, an all-optical remote frequency up-converting method by a SOA has high conversion efficiency by SOA gain, has small variance in the polarization of a signal by the SOA that is independent of the polarization of transverse electric (TE) and transverse magnetic (TM) modes, and can perform up-conversion when operating in a data signal bandwidth. However, the frequency up-converter is implemented as a separate device independent of the millimeter-wave generator.

Thus, conventional methods for implementing millimeter-wave generation and frequency up-conversion by two independent devices are not cost-effective. Although research into the implementation of these two functions using a single device has been conducted for the establishment of a low-cost RoF system, efforts are still ongoing in cost and technical terms.

SUMMARY OF THE INVENTION

The present invention provides an apparatus for and a method of generating millimeter waves, in which both millimeter-wave generation and frequency up-conversion can be achieved using a single device. In particular, an optical method can be used for the generation of millimeter waves of a signal at several tens of GHz and a harmonic locking method for generating high frequencies with low frequencies can be used for the generation of low-cost millimeter waves.

According to one aspect of the present invention, there is provided an apparatus for generating millimeter waves. The apparatus includes a mode-locking laser diode (LD), a modulator, and a radio frequency (RF) locking signaling unit. The mode-locking LD includes a DFB (distributed feedback) sector and a gain sector and generates high-frequency optical pulses through a passive mode locking. The modulator modulates an external optical signal using an electric signal and injects the modulated optical signal to the mode-locking LD to lock the optical pulses. The RF locking signaling unit injects the electric signal to the modulator.

The passive mode locking may be performed by applying a current that is lower than a threshold current of the mode-locking LD to the DFB sector, and the millimeter waves may be generated using a high-order harmonic pulse among the optical pulses generated in the mode-locking LD. The apparatus may further include a data signaling unit which generates a data signal to be transmitted and a combiner which combines the data signal and the electric signal to be simultaneously injected to the modulator. The data signal may be carried around the high-order harmonic pulse, whereby the frequency of the data signal is up-converted.

According to another aspect of the present invention, there is provided an apparatus for generating millimeter waves. The apparatus includes a mode-locking laser diode (LD), a modulator, a tunable laser source (TLS), and a signaling unit. The mode-locking LD includes a distributed feedback (DFB) sector and a gain sector and generates high-frequency optical pulses through a passive mode locking. The modulator locks the optical pulses, modulates an external optical signal using an electric signal including a data signal, and injects the modulated optical signal to the mode-locking LD to lock the optical pulses. The TLS injects the external optical signal to the modulator. The signaling unit injects the electric signal to the modulator.

The electric signal may include an RF locking signal for locking the optical pulses and a data signal for data transmission.

According to still another aspect of the present invention, there is provided a method of generating millimeter waves. The method includes generating high-frequency optical pulses through a passive mode locking by supplying a current that is lower than a threshold current of a mode-locking LD (laser diode) having a DFB (distributed feedback) sector and a gain sector to the mode-locking LD, modulating an external optical signal with an electric signal using a modulator and injecting the modulated optical signal to the mode-locking LD to lock the optical pulses, and generating the millimeter waves using the optical pulses locked through the injection of the modulated external optical signal.

The mode-locking LD may further include a phase control sector between the DFB sector and the gain sector. The gain sector is divided into a first gain sub-sector and a second gain sub-sector. Currents of 30 mA, 10 mA, 100 mA, and 77 mA are supplied to the DFB sector, the phase control sector, the first gain sub-sector, and the second gain sub-sector of the mode-locking LD, respectively, thereby generating millimeter waves of about 60 GHz.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
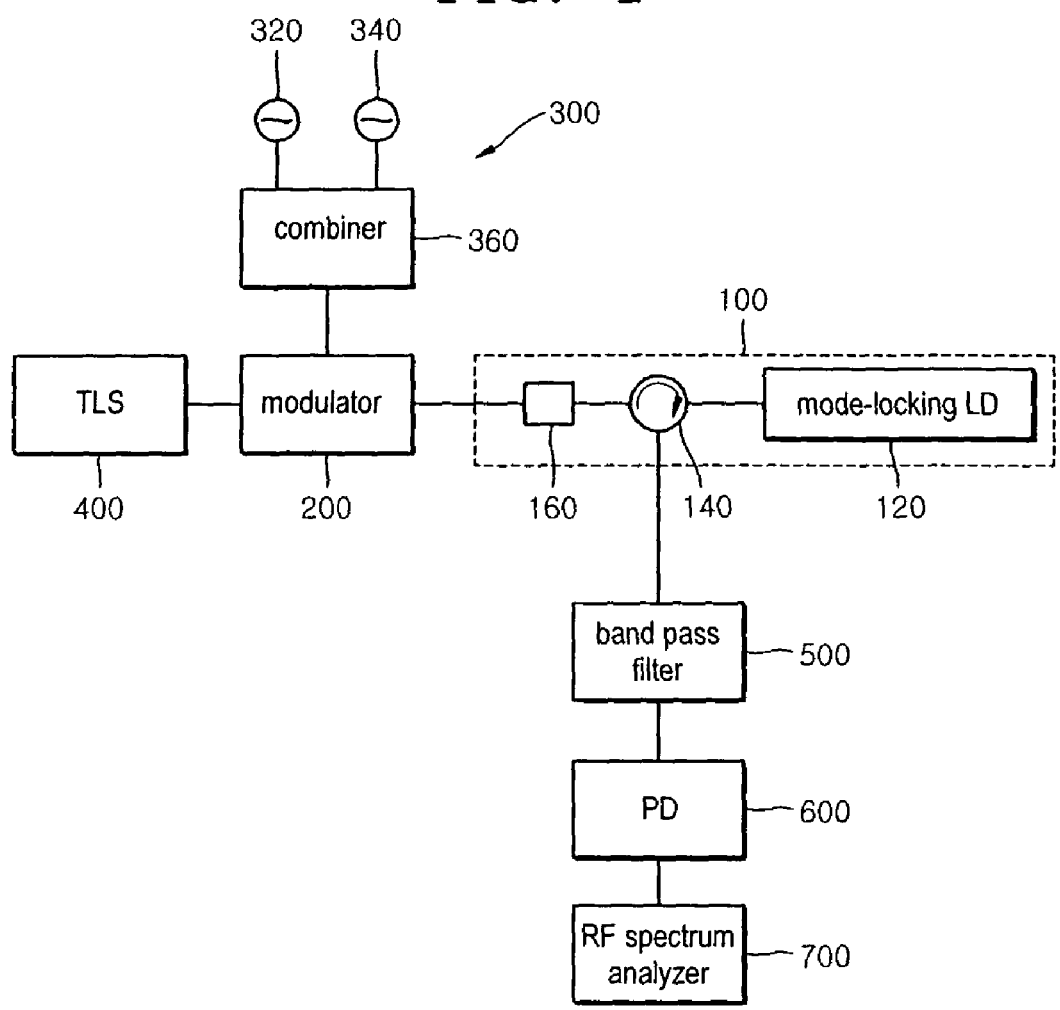
FIG. 1 is a schematic block diagram of an apparatus for generating millimeter waves according to an embodiment of the present invention.

Hereinafter, exemplary embodiments of the present invention will be described in detail with reference to the accompanying drawings. In the drawings, the size and shape of elements are schematically expressed or exaggerated for convenience and clarity of explanation and the same or similar elements are denoted by the same reference numerals. Terms used therein are used for explanation of the present invention and do not limit the meaning or scope of the present invention claimed in the appended claims.

FIG. 1 is a schematic block diagram of an apparatus for generating millimeter waves according to an embodiment of the present invention.

Referring to FIG. 1, the apparatus includes a harmonic up-converting unit 100, a modulator 200, a signaling unit 300, and a tunable laser source (TLS) 400.

The harmonic up-converting unit 100 includes a mode-locking laser diode (LD) 120, a circulator 140, and a polarizer 160 and performs high-frequency pulse generation and frequency up-conversion using the mode-locking LD 120. The configuration and operation of the mode-locking LD 120 will be described in more detail with reference to FIG. 2. The circulator 140 receives an optical signal from the modulator 200, injects the optical signal to the mode-locking LD 120, and delivers a high-frequency pulse signal from the mode-locking LD 120 to an external device. To optimally lock pulses of the mode-locking LD 120, the polarizer 160 for adjusting the polarization state of an optical signal of the modulator 200 may be installed in front of the circulator 140.

To lock a free-running oscillation frequency of the mode-locking LD 120 to a specific frequency, the modulator 200 receives an electric signal of the signaling unit 300, modulates an external optical signal, and injects the modulated optical signal to the mode-locking LD 120. At this time, the modulator 200 modulates the optical signal injected to the mode-locking LD 120 to a frequency that is the same as that of the electric signal and locks the oscillation frequency of the mode-locking LD 120 to the frequency of the optical signal.

The signaling unit 300 includes a radio frequency (RF) locking signaling unit 320, a data signaling unit 340, and a combiner 360. The RF locking signaling unit 320 generates an RF locking signal for locking pulses of the mode-locking LD 120 and the data signaling unit 340 generates a data signal to be transmitted. The RF locking signal of the RF locking signaling unit 320 and the data signal of the data signaling unit 340 are simultaneously injected to the modulator 200 by carrying the data signal into the RF locking signal. The combiner 360 combines the RF locking signal and the data signal.

The TLS 400 injects the external optical signal to the modulator 200. The optical signal of the TLS 400 is modulated into a pulse signal of a specific frequency by the RF locking signal and the data signal injected to the modulator 200.

The apparatus may also include a band pass filter 500 for extracting millimeter waves using a specific high-order harmonic pulse among the pulses generated by the mode-locking LD 120. To analyze the characteristics of the RF power of the pulse passed through the band pass filter 500, the apparatus may also include a photo diode (PD) 600 for converting an optical signal into an electric signal and an RF spectrum analyzer 700.

The overall operating principle of the apparatus illustrated in FIG. 1 will now be described. An appropriate current is supplied to the mode-locking LD 120 to generate pulses of a free-running oscillation frequency and the oscillation frequency is locked to a specific frequency using an external optical signal modulated by the modulator 200. At this time, not only pulses corresponding to a fundamental frequency that is the same as the frequency of the external optical signal modulated by the modulator 200 but also pulses corresponding to a high-order harmonic frequency are generated in the mode-locking LD 120. Millimeter waves are generated using a pulse at a required frequency among the pulses of the high-order harmonic frequency. The extraction of the millimeter waves using the pulse at the specific frequency may be performed using the band pass filter 500. By transmitting the data signal through the millimeter waves, the low-frequency data signal can be easily up-converted.

Figure 2:
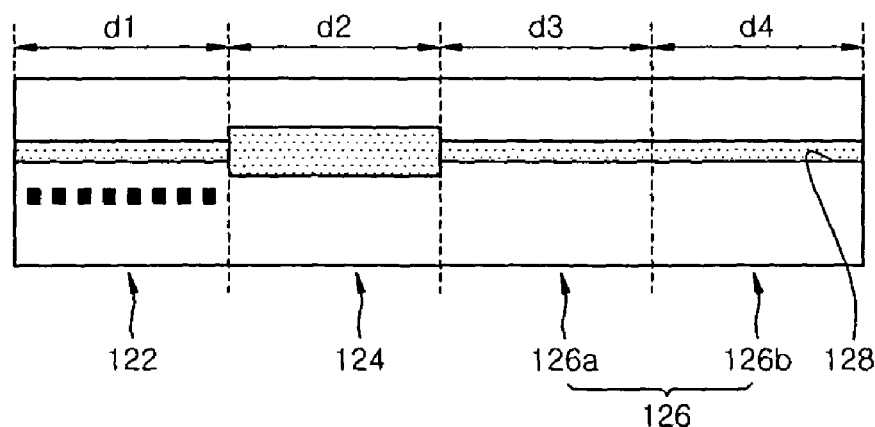
FIG. 2 is an as-cleaved facet (AC) of a mode-locking laser diode (LD) of the apparatus of FIG. 1.

FIG. 2 is an as-cleaved facet (AC) of the mode-locking LD 120, according to an embodiment of the present invention.

Referring to FIG. 2, the mode-locking LD 120 includes a distributed feedback (DFB) sector 122 used as a reflector, a phase control sector 124, and a gain sector 126. An antireflection coating layer is formed at the left end of the DFB sector 122 and an as-cleaved facet (AC) is formed at the right end of the gain sector 126. A waveguide 128 is formed over the mode-locking LD 120. The phase control sector 124 and the gain sector 126 control the phase and size of a generated laser.

In the current embodiment of the present invention, a current that is lower than a threshold current is supplied to the DFB sector 122 to simply use the DFB sector 122 as a single reflector. In other words, a laser generated in the DFB sector 122 oscillates to the phase control sector 124 and the gain sector 126 when the supplied current is higher than the threshold current. However, when a current that is lower than the threshold current is supplied, the DFB sector 122 cannot generate a mode and merely serves as a reflector with respect to a mode that oscillates in the gain sector 126. Here, reflection in the DFB sector 122 is probabilistic reflection through a grating formed in the DFB sector 122. Thus, the mode-locking LD 120 according to the current embodiment of the present invention constitutes a cavity using as-cleaved facet (AC) reflection and the reflector of the DFB sector 122. Here, a mode locking by the mode-locking LD 120 is considered as a passive mode locking. The phase control sector 124 facilitates pulse generation and frequency control by controlling the amount of supplied current.

To uniformly supply current to the gain sector 126, the gain sector 126 is divided into a first gain sub-sector 126a and a second gain sub-sector 126b. In the current embodiment of the present invention, for generation of 60 GHz millimeter waves, the DFB sector 122 has a length d1 of 0.5 mm, the phase control sector 124 has a length d2 of 0.5 mm, and the first gain sub-sector 126a and the second gain sub-sector 126b of the gain sector 126 have a length d3 of 1 mm and a length d4 of 1 mm, respectively. The entire length of the mode-locking LD 120 is 3 mm. A 30 mA current is supplied to the DFB sector 122, a 10 mA current is supplied to the phase control sector 124, a 100 mA current is supplied to the first gain sub-sector 126a, and a 77 mA current is supplied to the second gain sub-sector 126b. The threshold current of the DFB sector 122 is about 40 mA, which is higher than the 30 mA current supplied to the DFB sector 122.

In this case, the mode-locking LD 120 generates a high-frequency pulse at several tens of GHz, and in particular, a pulse of a free-running fundamental frequency of 14.65 GHz. In addition, the mode-locking LD 120 also generates high-order harmonic frequency pulses. Hereinafter, the characteristics of a pulse generated by the mode-locking LD 120 using the RF spectrum analyzer 700 will be described in detail.

Figure 3A:
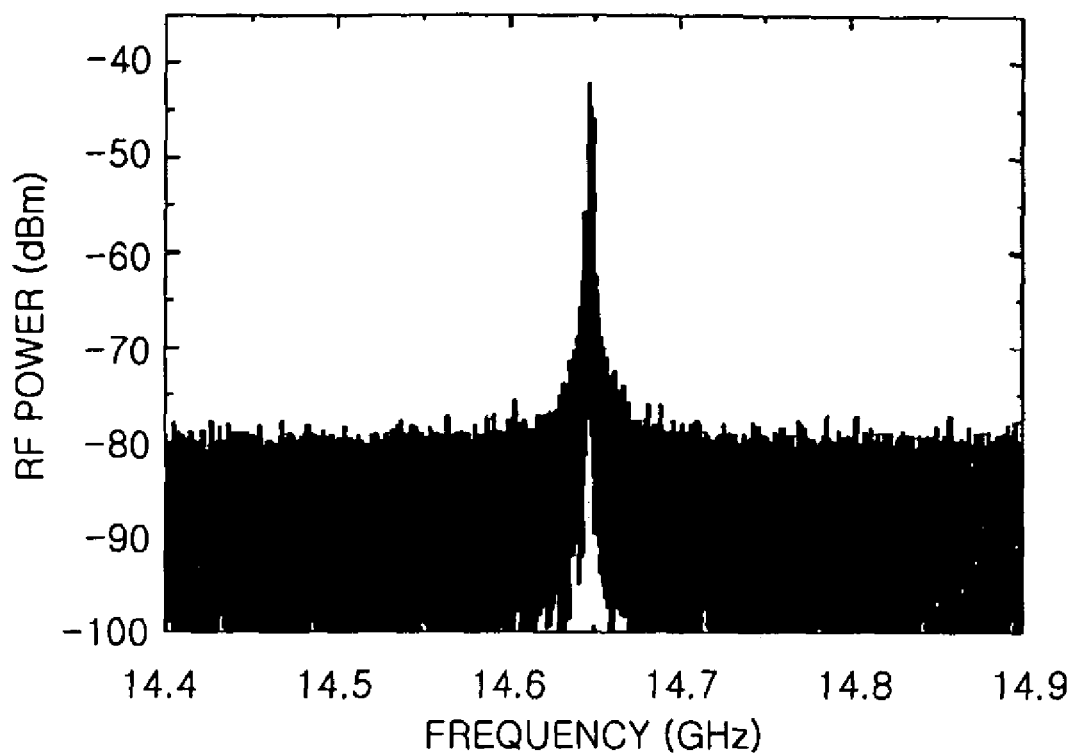
FIGS. 3A and 3B are graphs illustrating a radio frequency (RF) spectrum and an optical spectrum, respectively, of a free-running pulse generated in the mode-locking LD.
Figure 3B:
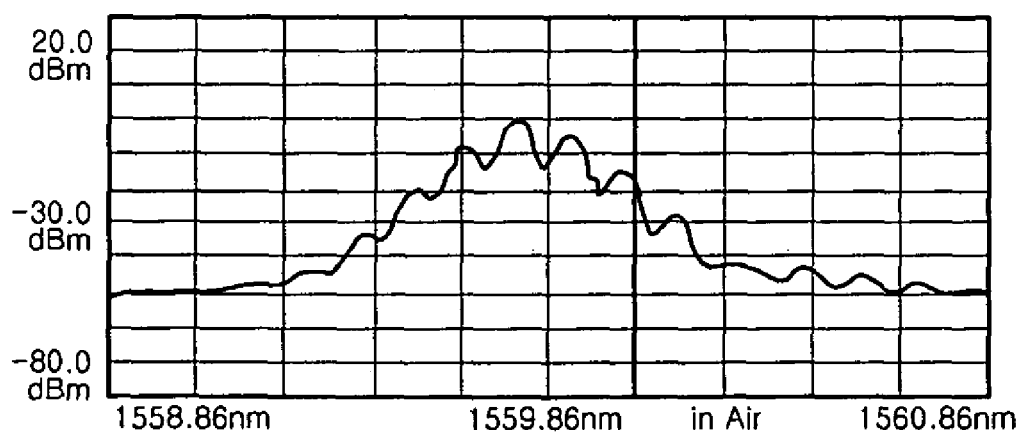

FIGS. 3A and 3B are graphs illustrating an RF spectrum and an optical spectrum, respectively, of a free-running pulse generated in the mode-locking LD 120.

FIG. 3A is a graph illustrating RF powers of a pulse according to frequencies, in which only a fundamental frequency domain of a free-running pulse is shown. It can be seen from FIG. 3A that the fundamental frequency of the free-running pulse is about 14.65 GHz and many noise components are mixed. Thus, the free-running pulse cannot be directly used and can be used only after being locked to a pulse having good phase noise.

FIG. 3B is a graph illustrating RF powers of a pulse according to wavelengths. It can be seen from FIG. 3B that the wavelength of the fundamental frequency is about 1559.76 nm and wavelengths of pulses due to many side modes, i.e., harmonic components, are mixed around the wavelength of the fundamental frequency. Thus, the pulse generated in the mode-locking LD 120 has many harmonic components.

Figure 4A:
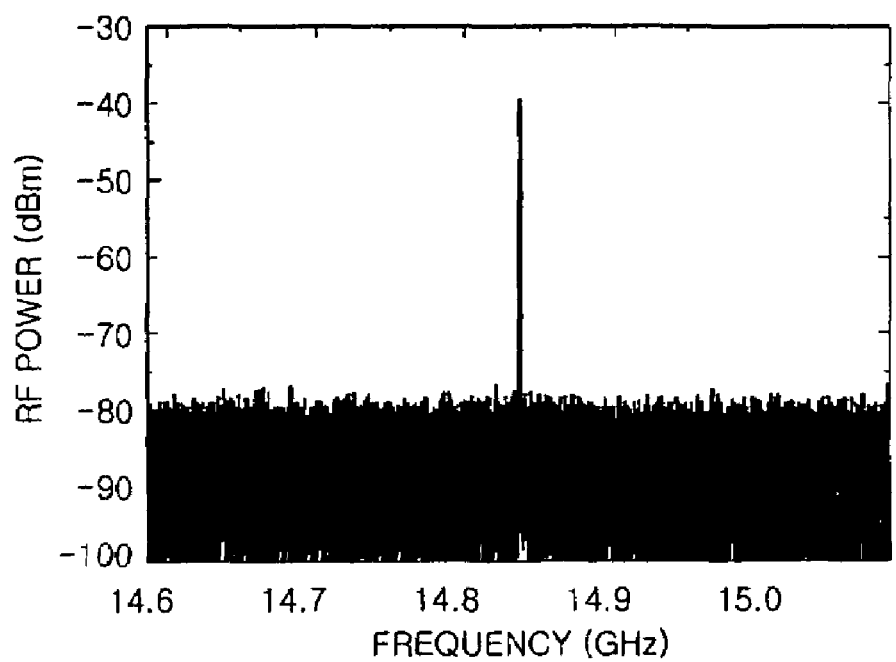
FIGS. 4A and 4B are graphs illustrating RF powers of a fundamental signal and a fourth harmonic signal, respectively, that are locked by an external optical signal according to frequencies.
Figure 4B:
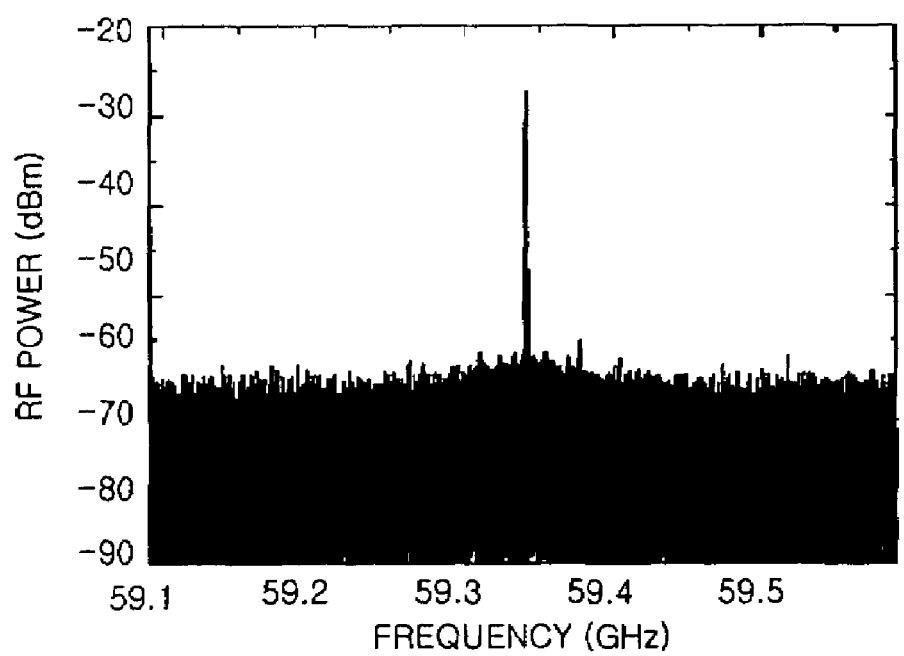

FIGS. 4A and 4B are graphs illustrating RF powers of a fundamental signal and a fourth harmonic signal that are locked by an external optical signal according to frequencies. The external optical signal injected to the modulator 200 for locking of pulses of the mode-locking LD 120 has a wavelength of 1570 nm and a power of 6.2 dBm and is modulated by an RF locking signal of 14.835 GHz. For optimal locking, the polarization state of the optical signal is controlled by the polarizer 160.

Referring to FIG. 4A, it can be seen that a free-running pulse of the fundamental frequency is locked to the external optical signal and thus has a narrow width. Here, the locked fundamental frequency pulse signal has a frequency of 14.835 GHz that is the same as the RF locking signal.

Referring to FIG. 4B, it can be seen that the locked fourth harmonic pulse signal also has a narrow width and has a frequency of 59.34 GHz that is nearly four times the fundamental frequency. The RF power of the locked fourth harmonic pulse signal is lower than that of the locked fundamental frequency pulse signal.

Although it can be appreciated from FIGS. 4A and 4B that the locked pulse signals have narrow widths, phase noises of the pulse signals should be accurately measured to obtain accurate information about the pulse signals.

Figure 5:
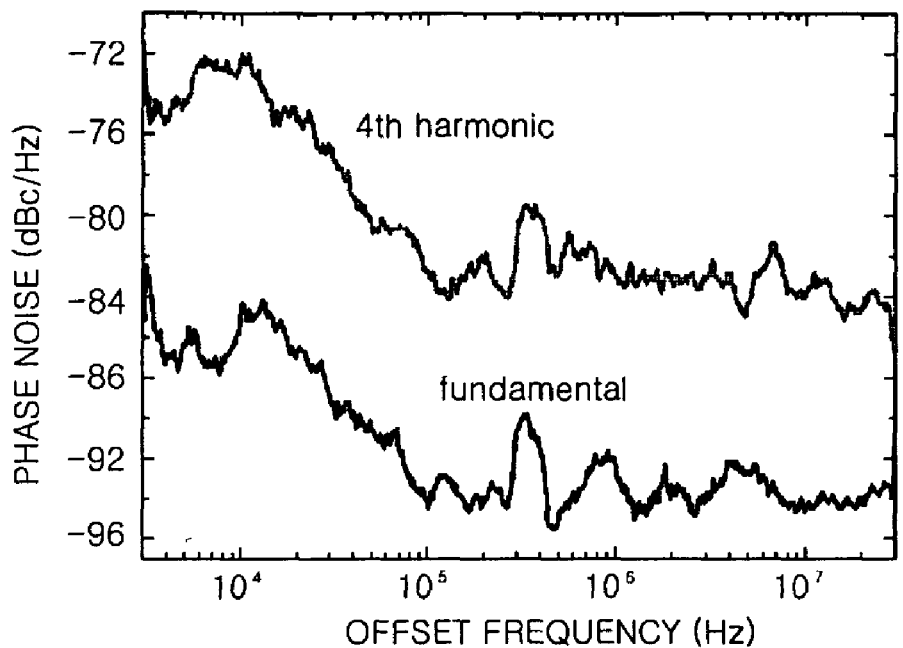
FIG. 5 is a graph illustrating phase noises of a fundamental signal and a fourth harmonic signal.

FIG. 5 is a graph illustrating the phase noises of the fundamental signal and the fourth harmonic signal of FIGS. 4A and 4B after passing through an amplifier having a gain of about 30 dB.

In optical injection locking, the amplitude of the phase noise of a high-order harmonic component is important because the amplitude of phase noise generally increases towards high-order components. Referring to FIG. 5, since a difference between phase noise of a fundamental component and a fourth harmonic component is about 12 dB and the phase noise of the fourth harmonic component is about −82 dBc/Hz@10 MHz, the fourth harmonic component can be stably used as millimeter waves. Here, @10 MHz means that phase noise at a frequency of 10 MHz is measured.

Figure 6:
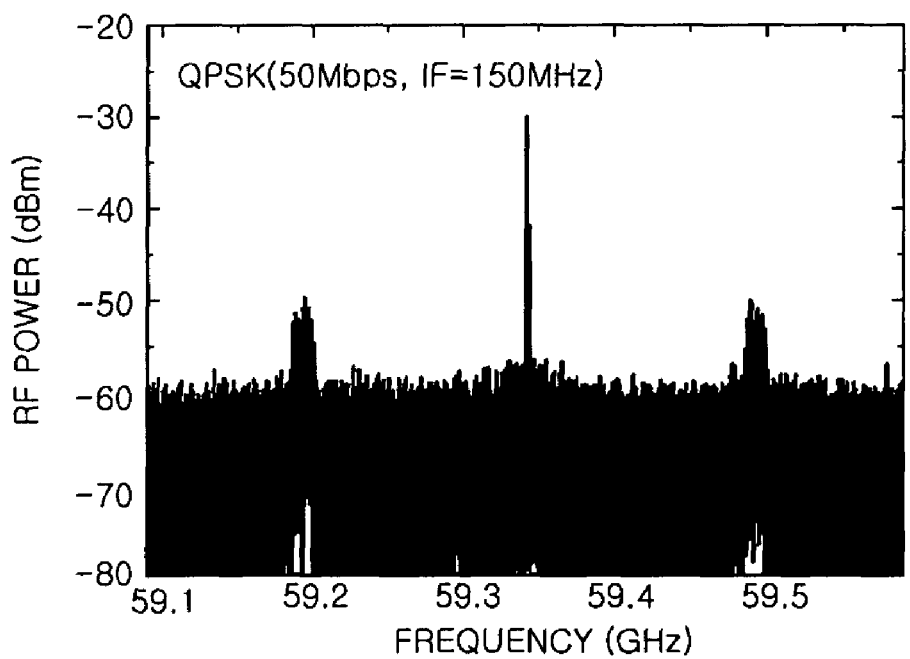
FIG. 6 is a graph illustrating a quadrature phase shift keying (QPSK) digital signal that is up-converted in millimeter waves generated according to an embodiment of the present invention.

FIG. 6 is a graph illustrating a quadrature phase shift keying (QPSK) digital signal that is up-converted in millimeter waves generated according to an embodiment of the present invention.

As mentioned above, a data signal to be transmitted can be carried into an RF locking signal by the combiner 360, the data signal and the RF locking signal modulate an external optical signal, and the modulated external optical signal is injected to the mode-locking LD 120. In this case, the data signal is a QPSK signal and has a carrier frequency of 150 MHz and a data transmission speed of 50 Mbps.

Once the external optical signal modulated with the RF locking signal of 14,835 GHz and the QPSK data signal is injected to the mode-locking LD 120, the RF locking signal locks free-running components and harmonic components of the mode-locking LD 120, and the QPSK data signal modulates the carrier density of the mode-locking LD 120 and thus is carried around harmonic components. As can be seen from FIG. 6, the QPSK data signal is carried in a portion that is 150 MHz from 59.34 GHz. Thus, the frequency of the data signal is up-converted.

It can be seen from those results that both millimeter-wave generation and frequency up-conversion can be achieved using a single device, i.e., the mode-locking LD 120.

As described above, according to the present invention, the apparatus for generating millimeter waves can simultaneously perform millimeter-wave generation and frequency up-conversion using a single mode-locking LD.

Furthermore, the apparatus can be employed in a RoF system, thereby simply establishing a RoF system and reducing cost in the implementation of such a RoF system.

While the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. An apparatus for generating millimeter waves, the apparatus comprising:
   a mode-locking LD (laser diode) which has a DFB (distributed feedback) sector acting solely as a reflector without generating a mode and a gain sector and generates high-frequency optical pulses through a passive mode locking, wherein the passive mode locking process is performed by applying a current that is lower than a threshold current of the mode-locking LD to the DFB sector, wherein the mode-locking LD comprises a phase control sector between the DFB sector and the gain sector, and wherein the millimeter waves are generated using a high-order harmonic pulse among the optical pulses generated in the mode-locking LD;
a modulator which modulates an external optical signal using an electric signal and injects the modulated optical signal to the mode-locking LD to lock the optical pulses; and
an RF (radio frequency) locking signaling unit which injects the electric signal to the modulator.

2. The apparatus of claim 1, further comprising a band pass filter which extracts the millimeter waves using the high-order harmonic pulse.

3. The apparatus of claim 1, wherein the high-order harmonic pulse is a fourth harmonic pulse.

4. The apparatus of claim 1, further comprising a TLS (tunable laser source) which generates the external optical signal.

5. The apparatus of claim 1, further comprising:
a data signaling unit which generates a data signal to be transmitted; and
a combiner which combines the data signal and the electric signal to be simultaneously injected to the modulator.

6. The apparatus of claim 5, wherein the data signal generated by the data signaling unit is a QPSK (quadrature phase shift keying) signal.

7. The apparatus of claim 5, wherein the high-order harmonic pulse among the optical pulses generated in the mode-locking LD is used to generate the millimeter waves, and
the data signal is carried around the high-order harmonic pulse, whereby the frequency of the data signal is up-converted.

8. The apparatus of claim 1, further comprising a polarizer which controls the polarization state of the external optical signal modulated by the modulator.

9. The apparatus of claim 1, wherein the gain sector of the mode-locking LD is divided into at least two sub-sectors to uniformly supply a current to the gain sector.

10. The apparatus of claim 9, wherein the gain sector is divided into a first gain sub-sector and a second gain sub-sector, and the DFB sector,
the phase control sector, the first gain sub-sector, and
the second gain sub-sector of the mode-locking LD have lengths of 0.5, 0.5, 1, and 1 mm, respectively.

11. The apparatus of claim 10, wherein the threshold current of the mode-locking LD is 40 mA, and
currents of 30 mA, 10 mA, 100 mA, and 77 mA are applied to the DFB sector, the phase control sector, the first gain sub-sector, and the second gain sub-sector of the mode-locking LD, respectively.

12. An apparatus for generating millimeter waves, the apparatus comprising:
a mode-locking LD (laser diode) which has a DFB (distributed feedback) sector acting solely as a reflector without generating a mode and a gain sector and generates high-frequency optical pulses through a passive mode locking, wherein the passive mode locking process is performed by applying a current that is lower than a threshold current of the mode-locking LD to the DFB sector, wherein the mode-locking LD comprises a phase control sector between the DFB sector and the gain sector, and wherein the millimeter waves are generated using a high-order harmonic pulse among the optical pulses generated in the mode-locking LD;
a modulator which locks the optical pulses, modulates an external optical signal using an electric signal including a data signal, and injects the modulated optical signal to the mode-rocking LD to lock the optical pulses;
a TLS (tunable laser source) which injects the external optical signal to the modulator; and
a signaling unit which injects the electric signal to the modulator.

13. The apparatus of claim 12, wherein the signaling unit comprises:
an RF (radio frequency) locking signaling unit which generates an RF locking signal for locking the optical pulses;
a data signaling unit which generates a data signal to be transmitted; and
a combiner which combines the data signal and the electric signal to be simultaneously injected to the modulator.

14. The apparatus of claim 12, wherein the data signal is carried around the high-order harmonic pulse, whereby the frequency of the data signal is up-converted.

15. The apparatus of claim 14, wherein the frequency of the RF locking signal is 14.835 GHz,
the carrier frequency of the data signal is 150 MHz, and
the high-order harmonic pulse is a fourth harmonic pulse.

16. A method of generating millimeter waves, the method comprising:
generating high-frequency optical pulses through a passive mode locking in a mode-locking LD (laser diode) having a DFB (distributed feedback) sector and a gain sector by supplying a current that is lower than a threshold current of the DFB sector causing the DFB sector to act solely as a reflector, wherein the millimeter waves are generated using a high-order harmonic pulse among the locked optical pulses, and wherein the mode-locking LD further comprises a phase control sector between the DFB sector and the gain sector;
modulating an external optical signal with an electric signal using a modulator and injecting the modulated optical signal to the mode-locking LD to lock the optical pulses; and
generating the millimeter waves using the optical pulses locked through the injection of the modulated external optical signal.

17. The method of claim 16, wherein the modulating of the external optical signal comprises injecting the electric signal to the modulator.

18. The method of claim 17, wherein the electric signal comprises an RF locking signal for locking the optical pulses and a data signal to be carried in the optical pulses.

19. The method of claim 18, further comprising, combining the RF locking signal and the data signal before injecting the electric signal to the modulator.

20. The method of claim 16, wherein the electric signal comprises a data signal and
the data signal is carried in the high-order harmonic pulse, whereby the frequency of the data signal is up-converted.

21. The method of claim 16, wherein the gain sector is divided into a first gain sub-sector and a second gain sub-sector,
the DFB sector, the phase control sector, the first gain sub-sector, and the second gain sub-sector of the mode-locking LD have lengths of 0.5, 0.5, 1, and 1 mm, respectively, and
the threshold current of the mode-locking LD is 40 mA.

22. The method of claim 21, wherein the millimeter waves are generated by applying currents of 30 mA, 10 mA, 100 mA, and 77 mA to the DFB sector, the phase control sector, the first gain sub-sector, and the second gain sub-sector, respectively.

23. The method of claim 22, wherein the electric signal comprises an RF locking signal for locking the optical pulses and a data signal to be carried in the optical pulses, the frequency of the RF locking signal is 14.835 GHz, the carrier frequency of the data signal is 150 MHz, the millimeter waves are generated using a fourth harmonic pulse among the locked optical pulses, and the data signal is carried in the millimeter waves, whereby the frequency of the data signal is up-converted.

* * * * *